INVENTOR.
MARTIN E. GERRY
BY FOWLER, KNOBBE
& GAMBRELL
ATTORNEYS.

FIG. 8.

INVENTOR.
MARTIN E. GERRY
BY FOWLER, KNOBBE
& GAMBRELL
ATTORNEYS.

United States Patent Office 3,340,632
Patented Sept. 12, 1967

3,340,632
COMBINATION SOUND AND SLIDE PROJECTOR
Martin E. Gerry, 13452 Winthrope St.,
Santa Ana, Calif. 92705
Filed Mar. 24, 1965, Ser. No. 442,346
17 Claims. (Cl. 40—28.1)

The present invention relates to an improved projector for optically projecting a stationary slide and simultaneously reproducing or recording a sound track thereon.

A particular advantage of the present invention is that it includes a sound reproduction assembly which requires no movement thereof between the finish of one slide and the start of another. Accordingly, the time delay between the termination of one slide and the showing of another is dependent only upon the speed which the slides may be withdrawn and replaced in a storage magazine. In addition, the lack of any retrace mechanism simplifies the structure of the present invention with the attendant advantages of lower cost and higher reliability.

Another feature of the present invention is that it utilizes rigid plastic slides having an opening within which is mounted the visual information and a planar surface particularly adapted for supporting a thin coating of magnetic material for recording a magnetic sound track. This type of slide is highly durable as well as being inexpensive to manufacture.

Another object of this invention is to combine an improved combined slide and sound projector which is completely independent of the space orientation of the projector.

Still another object of the present invention is to provide an improved slide and sound projector having an improved means for completely and automatically withdrawing and replacing successive slides from a storage magazine.

Other and further objects, features and advantages of the invention will become apparent as the description proceeds.

Briefly, in accordance with a preferred form of the present invention, a combined slide and sound projector includes a sound reproduction system comprising a pair of magnetic recording and reproducing heads mounted on a shaft a predetermined distance apart for recording or reproducing sound from a stationary slide containing both visual information and a slide sound track. This shaft is supported for rotary motion about a first axis perpendicular to the slide and for linear motion along a second axis parallel to the slide. Further, this sound reproduction assembly is translated along the second axis as it is rotated about the first axis so that one of the heads traces a spiral path from a predetermined start to a predetermined end position corresponding to the start and end of the sound track. During the record scan, the other of the sound reproducing heads is translated from the end to the start position of the record so that it is automatically positioned at this start position at the termination of the recording scan. Accordingly, no retrace or other movement of the sound reproduction assembly is required between the showing of succeeding slides.

Another advantageous feature of the preferred embodiment is its provision of a means for precisely stopping the sound reproduction assembly at the end of each record scan. This arresting means preferably includes a switch activator integral with each recording head and a slot or other means on each head adapted to cooperate with a cycle termination solenoid. A pair of stationary switches are so mounted with respect to each of the actuators on the heads that the switches are respectively actuated a predetermined distance prior to the termination of the record scan. When these switches are actuated, power is turned off to the means for imparting rotational movement to the sound reproduction assembly and the stop solenoid is deenergized. Accordingly, the sound reproduction assembly is coasting to a stop when it physically engages the stop solenoid.

Still another feature of the preferred embodiment of this invention is means for automatically feeding the slides in sequence. A motor driven record injector bar assembly translates a record within the projector to a record carrier magazine, which magazine is then translated a predetermined distance by an index gear and engaged rack gear assembly. In this manner, when the record injector bar assembly is returned, it engages the record immediately adjacent to the one previously shown. Means are also provided for selectively advancing the carrier magazine in forward and reverse directions thereby selectively varying the slide sequence.

A more thorough understanding of the invention may be obtained by a study of the following detailed description taken in conjunction with the accompanying drawings in which.

Figure 1:
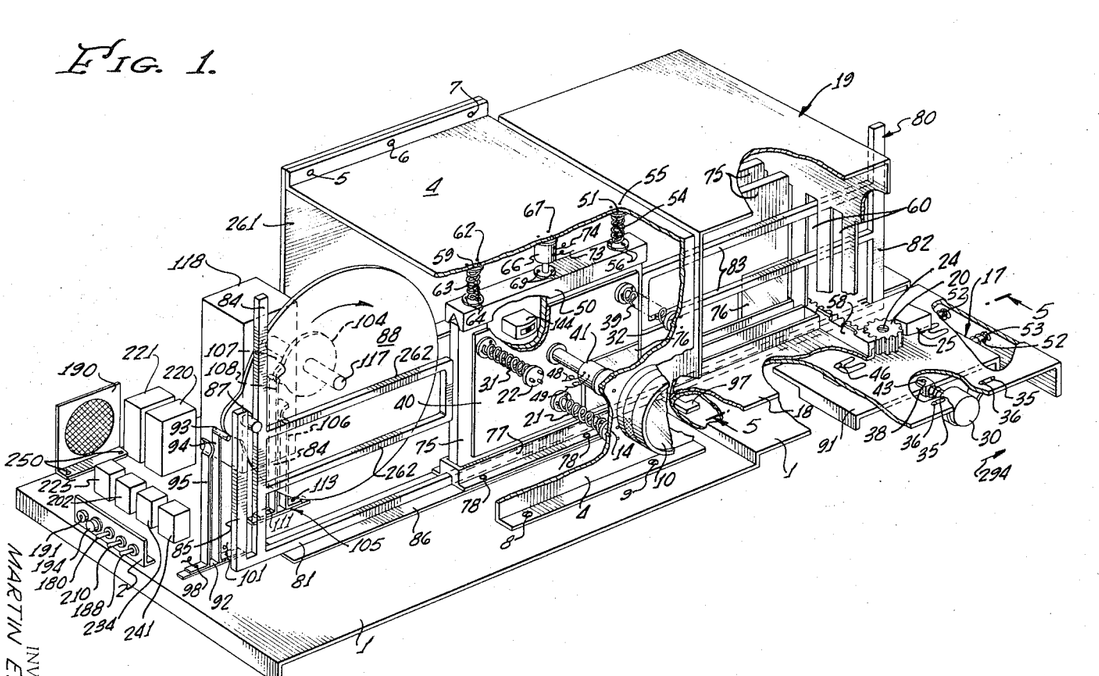
FIG. 1 is a perspective view, partially in cross-section, of a combination sound and slide projector constructed in accordance with this invention.
Figure 2A:
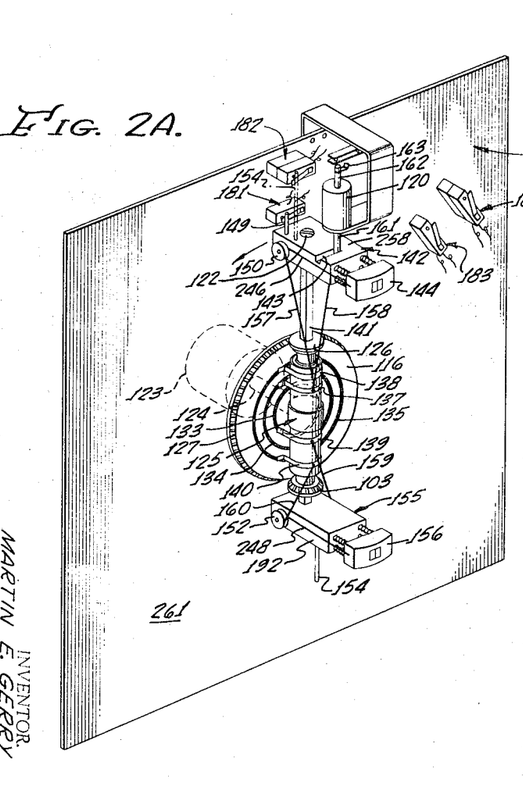
FIG. 2A is a perspective view showing details of the sound reproduction assembly and driving means therefor.
Figure 2B:
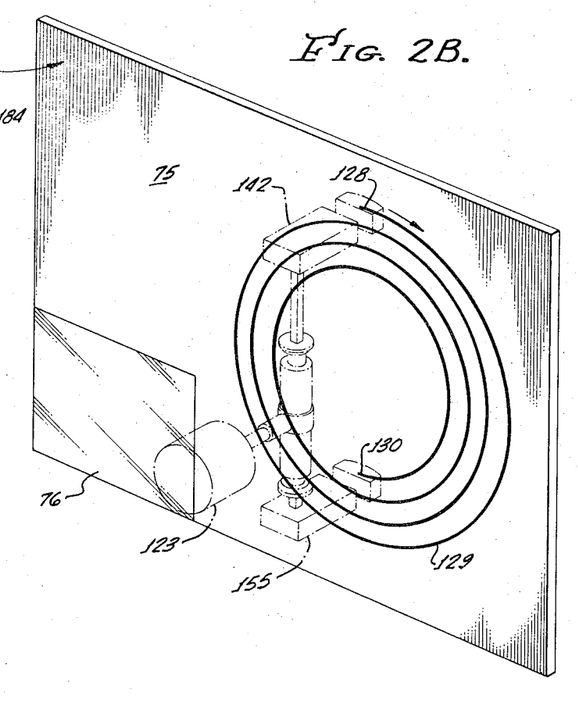
FIG. 2B is a perspective view illustrating the manner in which the sound reproduction assembly traces a spiral path to follow the sound track of the record.

*Support base.*—Referring now to FIGS. 1 and 2, sub-assembly mounting plate 261 is mechanically affixed to base 1 by means of screws. This sub-assembly mounting plate 261 is rigidly supported by a bracket 4 which is supported and mechanically affixed by screws 8, 9, FIG. 1 to base 1 on one end and by screws 5, 6, 7, to sub-assembly mounting plate 261 on the other end thus giving total structural support to bracket 4 and sub-assembly mounting plate 261.

*Sound reproduction means.*—As shown in FIG. 2, and electrical motor 123 is mechanically affixed at the rear of sub-assembly mounting plate 261. The motor shaft 124 extends through an aperture of the plate 261 and is affixed to a sleeve 125 of the head drive mechanism. A sound reproduction assembly comprises a continuous reversible drive shaft 141 which extends through and is supported by the sleeve 125 and which supports at opposite ends a path of head assemblies 142 and 155. These head assemblies are fixedly mounted to the shaft by bolts 122 so that the sound reproducing heads are mounted and maintained a predetermined distance apart.

The sleeve assembly 125 supports the sound reproduction assembly for rotary motion about the axis of shaft 124 and for linear motion along the axis of shaft 141. In addition, as described below, the assembly 125 causes the shaft 141 to be translated along its axis as the assembly is rotated by motor 123 by means of a bevel gear 127 affixed to plate 261 and in engagement with rotatable bevel gears 103 and 126.

*Overall operation of sound reproduction assembly.*—The operation of the sound reproduction assembly is as follows: the rotational motion of the head assemblies 142 and 155 together with the linear motion along the axis of shaft 141, causes the heads to trace respective spiral geometric patterns. In the position shown in FIG. 2A, it may be seen that head assembly 142 starts from a spatial position corresponding to the starting point 128 of the spiral trace 129 magnetically made on the record 75 as shown in FIG. 2B and head assembly 155 is positioned 180° opposite head 142 and located at a spatial position corresponding to the finish point 130 of the spiral magnetic trace. If the sound reproduction assembly is caused to rotate in the direction of the arrow shown in FIG. 2B, head assembly 142 traces a spiral path corresponding to the magnetic trace 129, eventually reaching the position 130. At the same time, the head assembly 155 has traced another spiral path and is located at point 128 when head assembly 142 reaches point 130. Shaft 141 is alternately translated in opposite directions through sleeve 125 so that at the end of each record scan sequence, one or the other of the head assemblies 142, 155 will always be in the record start position. In this manner, the present invention does not require that the sound reproducing means be retraced before starting the new scan sequence.

Figures 3, 4:
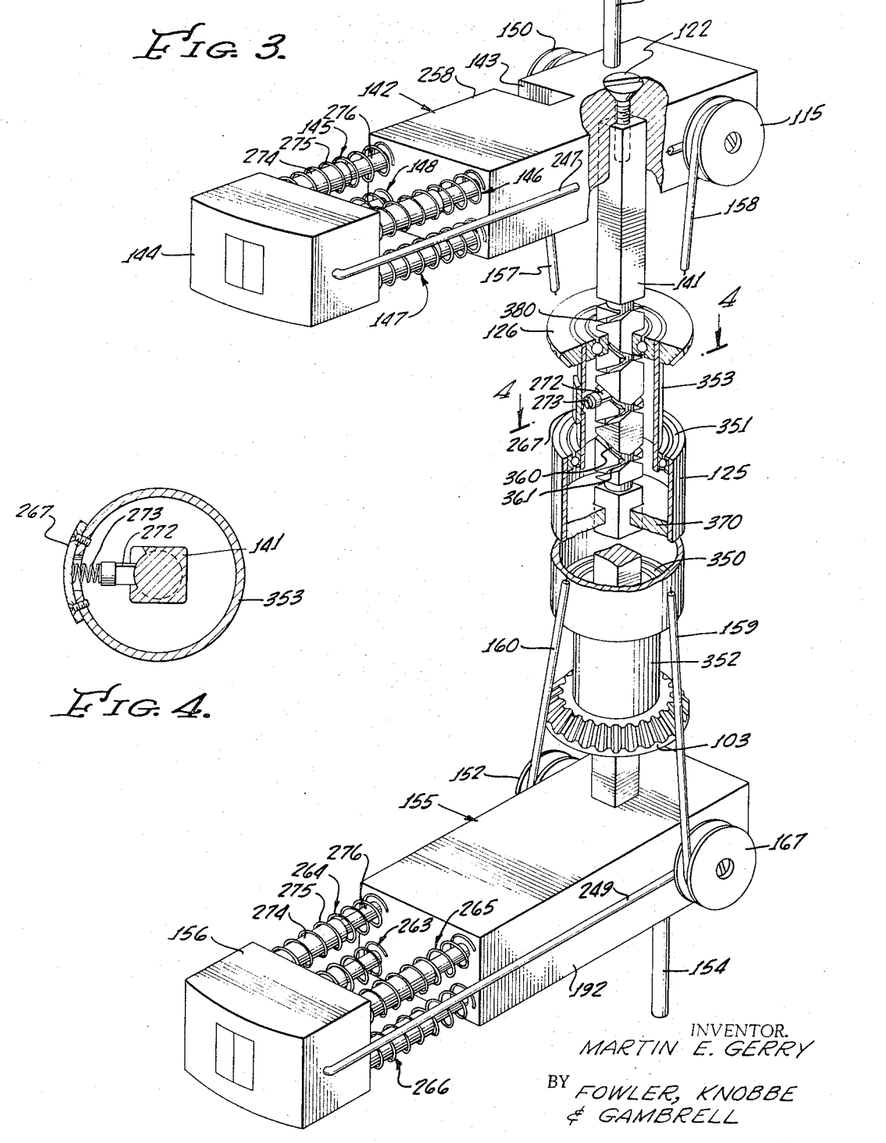
FIG. 3 is an enlarged perspective view of the sound reproduction assembly and the means for translating same along an axis orthogonal to its axis of rotation.
FIG. 4 is a cross-sectional view taken along line 4—4 of FIG. 3 showing details of the follower member.

*Head assemblies 142, 155.*—As shown in FIG. 3, head assembly 142 comprises head 144 connected to head transport mounting block 258 by means of spring float assemblies 145, 146, 147 and 148, each spring float assembly having concentric cylinder guides 274 and 276 imbedded respectively in head 144 and head mounting block 258, with tension springs 275 coaxially placed with respect to each of the concentric cylinder guides thereby causing head 144 to rest against the surface of record 75.

Similarly, head assembly 155 comprises head 156 connected to head transport mount block 192 by means of spring float assemblies 263, 264, 265 and 266, each spring float assembly having concentric cylinder guides 274 and 276 imbedded respectively in head 156 and head mounting block 192 with tension springs 275 coaxially placed with respect to each of the two concentric cylinder guides, thereby causing head 156 to rest against the surface of magnetic oxide or similar recording material provided on the surface of record 75.

*Means for conducting electrical signals to the sound reproduction assembly.*—The manner in which the electrical signals are carried to the movable head assemblies 142 and 155 is illustrated in FIGS. 2A and 3. Head transport mount block 258 is made of electrically insulated material and has mounted thereon oppositely disposed spring retractable bobbins 115 and 150. Wire 246 electrically connects head 144 to bobbin 150 while wire 157, taken up on retractable bobbin 150, is electrically connected to brush contact 138. Brush contact 138 cooperates with and makes connection with commutator ring 135 whose axis corresponds to the motor shaft 124. Ring 135 as well as the other commutator rings 134 and 133 are fixed to an insulated member 116 attached to the plate 261. In this manner, wire 157 provides a signal return path from lead 246 of head 144 which is taken up or released from bobbin 150 as the motion of assembly 142 dictates. Wire 247 electrically connects the other terminal of head 144 to bobbin 115 and wire 158, taken up on spring retractable bobbin 115, is electrically connected to brush contact 137. This brush contact cooperates with and makes electrical connection with commutator ring 134. Commutator ring 135 provides a common return path for both return assemblies whereas rings 134 and 133 are used for the other leads of the respective heads 144, 156.

In a similar matter, the head transport block 192 is made of electrically insulated material and has mounted thereon oppositely disposed spring retractable bobbins 152 and 167. Wire 248 electrically connects one terminal of head 156 to bobbin 152 and wire 160 electrically connects bobbin 152 to brush contact 140, which cooperates with and makes electrical connection with commutator ring 135. Wire 249 electrically connects the other terminal of head 156 to bobbin 167 and wire 159 electrically connects bobbin 167 to brush contact 139. This brush contact cooperates with and makes electrical connection with commutator ring 133.

*Means for reciprocally translating shaft 141 in sleeve 125.*—A detailed view of the means and reciprocally translated shaft 141 in the sleeve 125 is shown in FIGS. 3 and 4. Sleeve 125 includes first and second roller bearings 350, 351, each having their outer race fixed to the inner wall of sleeve 125 and their inner races respectively fixed to the ends of gear mounting sleeves 352, 353. These latter sleeves are respectively mounted at one end to the ball bearing and at the other end to the respective bevel gears 103, 126. Sleeve 353 further incorporates a means for retaining a follower member 272, retained in place by spring 273 attached to the follower member cover plate 267. This cover plate 267 is mechanically fixed to the sleeve 353 by screws or like means. The follower member 272 rides in either helical groove 360 or 361, which respectively comprise oppositely pitched threads on shaft 141.

Shaft 141 is retained for translatory movement within sleeve 125 by a bearing 370 fixed to the inner wall of sleeve 125 and respective bearings rotatably mounted with respect to sleeves 352 and 353, only one such bearing identified as 380 being shown in the figure. It will thus be seen that shaft 141 is free to translate with respect to sleeves 125, 352, 353 but is prevented from rotating about its longitudinal axis by bearing 370. In this manner, the head assemblies 142, 155 are maintained in orthogonal alignment with the record 75.

Shaft 141 is caused to translate with respect to the sleeve 125 by rotation of the follower member 272 which alternately engages the helical groove 360, 361 when the sleeve 353 is caused to rotate about the shaft 141. Shaft 141 is then caused to move linearly along its axis in first one direction and then the other. Since the sleeve 353 is caused to rotate by means of the gear 126 and fixed bevel gear 127, the shaft 141 is translated in conjunction with rotary movement with sleeve 125 thus resulting in the head assemblies 142, 155 tracing the spiral geometric patterns described hereinabove.

*Means for arresting rotational movement of the sound reproduction assembly.*—FIGS. 2A and 3 further illustrate the means for arresting rotational movements of the sound reproduction assembly when one or the other of the head assemblies 142, 155 reach a spatial condition corresponding to the finish point 130 of the sound track 129. As shown, an end of cycle termination solenoid 120 is fixedly mounted on sub-assembly plate 261. Likewise, end of travel momentary contact switches 183, 184 and transfer switches 181, 182 are all mounted on the sub-assembly mounting plate 261.

Head assembly 142 includes the head transport mounting block 258 having a head stop position slot 143 cut into the block to enable stopping of head 144 in exactly the same spatial condition for alternate scan cycles. This arresting action is provided by shaft 161 of the cycle termination solenoid 120 shown in the released or stopped position in FIG. 2A. As described below, the shaft 161 is placed in this position when the head assembly 142 is coasting to a stop. The head assembly 142 further includes a transfer contact stop shaft 149 which is secured or molded into block 258 and head assembly 155 includes a substantially longer transfer contact stop shaft 154 secured to block 192. Shaft 149 is so positioned on block 258 that its spatial distance from plate 261 is such that only shaft 149 is able to cause cooperation between the moving and stationary contacts of head transfer switch 181 and head end of travel switch 183. Contrarywise, the distance between plate 261 and shaft 154 is such that shaft 154 misses both switches 181 and 183 at all times.

The head assembly 155 includes a head stop position slot in the head transport mounting block 192 (not shown, but positioned identical to slot 143) to enable stopping of the head 156 at exactly the same place each time the shaft 161 of cycle termination solenoid 120 is released. The transfer contact shaft 154 of head assembly 155, however, is longer than shaft 149 for engaging the moving contact with the stationary contact of both the head transfer switch 182 and head end of travel switch 184 for initiating the stopping of head assembly 155.

The operation of the arresting means is as follows: Near the end of the spiral recording or reproducing pattern, the contact pair 175, 176 of switch 183, or the contact pair 178, 179 of switch 184 are caused to be momentarily engaged by either stop shaft 149 of head assembly 142 or stop shaft 154 of head assembly 155. As described hereinafter with reference to the schematic circuit of FIG. 8, the making of contact between either contact pair of these end of travel momentary switches results in the deenergization of solenoid 120 thereby releasing shaft 161 together with its fixed armature 162 and protrusion 163. The downward drop of shaft 161 due to gravity disengages contact pair 165, 166 thus removing alternating power from motor 123. One or the other of slots 143 in the head assemblies then coasts into and cooperates with shaft 161 to bring the sound reproduction assembly to an exact stop position.

*Sound-slide record transporting, positioning and registration means.*—Referring to FIGS. 1, 5, 6 and 7, the sound-slide record transporting, positioning, and registration mechanism is comprised of base 1 on which is mounted bracket 4 mechanically affixed as heretofore above described. Record injector bar assembly 80 has a lower horizontal member 81, which rides on Teflon bearing strip 86, adhesively or otherwise mechanically affixed to base 1. Member 81 rides under the record injection guide 77 which is mechanically held to base 1 by screws 78. Right vertical member 82 of the record injector bar assembly 80 has welded to it the right hand horizontal member 83 of record injector bar assembly. On insertion of record 75 into the projector, member 83 extends through slots 60 of record carrier magazine, and pushes the record 75 on to record injection guide 77. Record 75 rests on the left side against the left hand horizontal member 262 of the injector assembly so as to align the record in perfect registration along its axis of horizontal motion.

Figure 5:
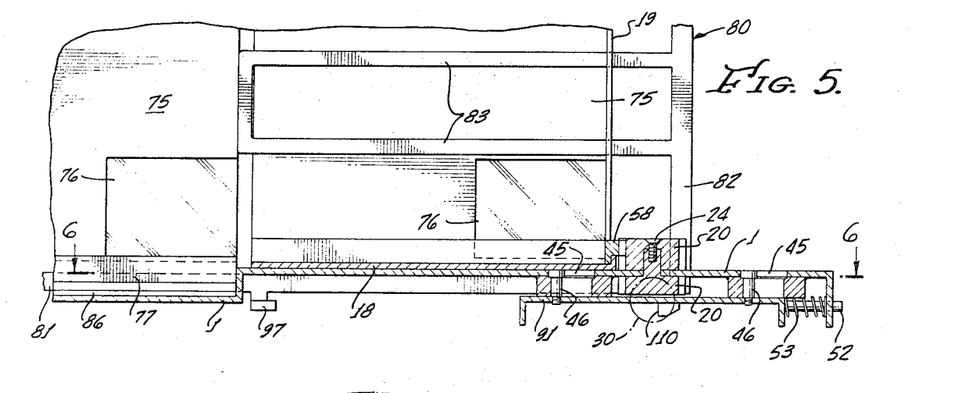
FIG. 5 is a cross-sectional view taken along line 5—5 of FIG. 1 further illustrating the record transport mechanism.

Simultaneously, backplate retract solenoid 41 is held by mounting screws 42 to bracket 4 and when electrically deenergized causes backplate 40 to travel towards record 75. Backplate 40 is guided by backplate return guides 14, 22 and 32, which consist of two concentrically fitted cylinders coaxial with springs 21, 31 and 39, and are respectively mounted by screws to bracket 4, and also respectively mounted by screws to backplate 40. The deenergized solenoid 41 permits springs 21, 31 and 39 to push backplate 40 against record 75 thereby creating a firm rest for record 75 and recording heads 144 and 156 during the recording of playback cycle. Record retention bar 50 provides a vertical push against record 75, and when in place prevents record 75 from moving in a vertical direction by virtue of deenergizing of retention bar retract solenoid 66. This solenoid is attached to bar 50 by mounting screws 69 and to bracket 4 by mounting screws 67. Record retention bar 50 is guided by means of retention bar guides 51 and 59 which are comprised of two concentric cylinders coaxial respectively with retention bar return springs 54 and 63. The retention bar guides 51 and 59 are respectively mounted by screws 55 and 62 to bracket 4 and by screws 56 and 64 to bar 50. The deenergized retention bar retract solenoid 66 permits springs 54 and 63 to push record retention bar 50 against the upper edge of record 75 and hold same firmly in place thus obtaining essentially perfect record positioning and registration after the record 75 is transported from the record carrier magazine 19. At this time magnetic heads 144, 156 are resting firmly on record 75 ready for recording or reproducing of sound, and viewing of a slide, transparency or photograph 76 inserted in groove of record 75. This slide is illuminated by means of a normal projector lighting system, not shown herein for simplicity, and images therefrom projected by means of optical assembly 10, which is mechanically mounted on and attached to bracket 4, projecting photographic image on a screen.

Record carrier magazine 19, retaining audio-visual record assemblies 75, are stacked in compartmented sections of the record carrier magazine 19, and with record injector bar assembly 80 moved to the extreme right, so that member 83 is substantially out of slot 60 and member 262 is substantially behind backplate 40, the carrier 19 is inserted into projector so that its base rests on record carrier guide bracket 18 which in turn is mechanically attached by screws to base 1.

*Forward-reverse record indexing mechanism.*—Bracket 18 is used to guide carrier 19 and provide alignment with an index gear 20 forming part of a forward-reverse record indexing mechanism 17. The teeth of gear 20 engage with record carrier index gearing rack 58 to move carrier 19 forward or backward dependent on direction of motion of index gear 20, which in turn is dependent on the position of forward-reverse record indexing mechanism 17. This forward-reverse record indexing mechanism 17 is comprised of an index plate 91. Index plate guide pins 52, FIGS. 1, 5, 6 and 7, are inserted through index plate return springs 53, FIGS. 1, 5, 6 and 7 into holes in vertical member of base 1 to provide normal repositioning of index plate 91. Index gear 20 is mounted by means of index gear mounting screw 24 to a bracket affixed or welded to the underchassis of said index plate 91. Index block 25 is mounted and mechannically affixed to base 1 and index block retains index ball bearing detent 29 which cooperates with the teeth of index gear 20 to provide a detent action.

Index plate 91 also supports a set of pawls 291 and 299 (FIGS. 6, 7) mounted on index plate 91 by means of pawl mounting pivot pins 292, so that these pawls can freely rotate thereon. Pawl return springs 295 respectively engage the pawls at one end and are held on the other end by spring retention studs 296 so that when index plate 91 is moved in the direction of arrow 294 (FIG. 6), either pawl 291 or pawl 299 (whichever is then engaged with index gear 20), the leading edge of the pawl cooperates with gear teeth 20 to rotate index gear 20 through one tooth position. Pawl 291 or 299 is then returned to its normal position by spring action of pawl return spring 295 pulling on said pawl enabling the pawl to skirt by the gear teeth of index 20.

Figure 6:
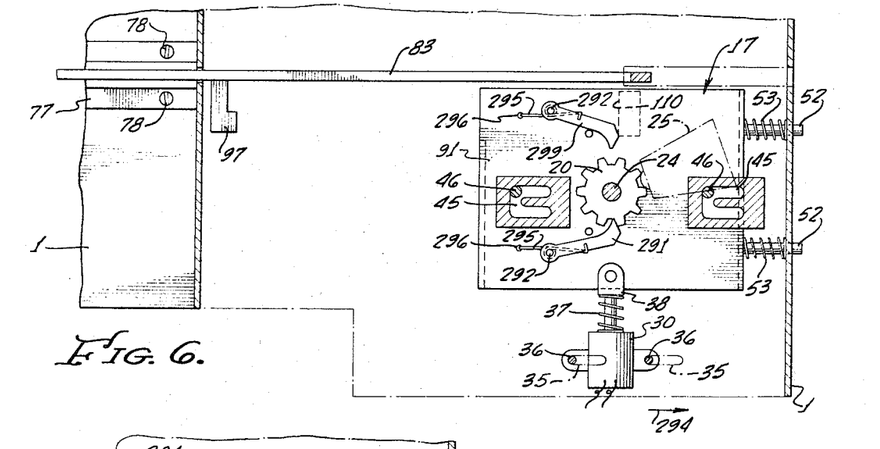
FIG. 6 is a cross-sectional view taken along line 6—6 of FIG. 5 and showing details of the forward-reverse indexing mechanism.

Pawl 291, shown as engaging gear 20 in FIG. 6, is set for operating or moving record carrier magazine 19 in a forward direction. The disengaged pawl 299 is used for reversing the record carrier magazine 19 when said pawl 299 is engaged in a cooperative position with gear teeth of index gear 20, which occurs when solenoid 30 is energized. The indexing mechanism 17 is then moved to the forward position in indexing slots 45 by solenoid plunger retraction into solenoid 30. Solenoid 30 is mechanically coupled via index plate holding bracket 38 and retaining screw 43 to index plate 91. The shaft of solenoid 30 retains solenoid retract spring 37 which normally forces index plate 91 to its normal forward feeding record carrier position due to solenoid 30 being normally deenergized. Solenoid 30 is mounted by means of solenoid suspension screws 36 threaded into holes in the solenoid frame. These screws 36 extend through the reverse record carrier solenoid free motion slots 35. The U-shaped index slots 45 in base 1 have extended through them screws 46 (FIGS. 1, 5, 6, 7) which thread into holes of the index plate 91

Figure 7:
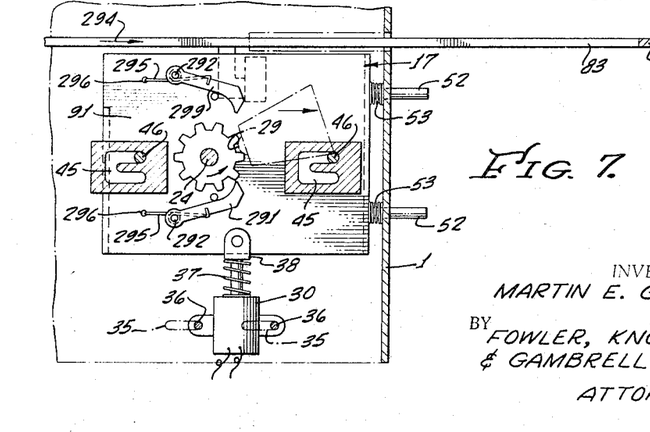
FIG. 7 is a plan view of the forward-reverse indexing mechanism shown in the position with the record injector assembly in its withdrawn position.

(FIG. 5) to both suspend index plate 91 and permit free motion thereof. The operation of the forward-reverse record indexing mechanism 17 is as follows. When the record injector bar assembly 80 is translated in the direction of arrow 294, the striker arm extension 97 of the record injector bar assembly moves to engage striker plate 110 causing index plate 91 to translate as shown in FIG. 7. If solenoid 30 is deenergized, pawl 291 will engage gear tooth of index gear 20 due to motion of index plate 91 to move the record carrier magazine 19 forward. Or, if solenoid 30 is energized, pawl 299 is engaged and cooperating with gear tooth of index gear 20 to move the record magazine 19 in a reverse direction. FIGS. 1, 5, 6, 7 show screws 46 positioned during the normally deenergized state of solenoid 30 or forward motion position of record carrier magazine 19. In the energized state of solenoid 30, the shaft of solenoid 30 will be retracted and screws 46 will be positioned in the other segment of slots 45, thereby causing the indexing mechanism 17 to engage pawl 299 with tooth of index gear 20 and rotate the index gear so as to reverse motion of record carrier magazine 19.

*Cycle programming means.*—As shown in FIG. 1, a control circuit mounting bracket 2 is mounted to base 1 by means of mounting screws. Bracket 2 retains and has mounted thereon microphone jack 191, start cycle push button 194, record carrier magazine switch 180, sound record-reproduce switch 210, and main alternating current power switch 188. Selector relay 225 for head 144, selector relay 202 for head 156, record cycle start relay 234, end of cycle stop relay 241, audio amplifier 221, carrier modulator 220 and injector motor 118 are all mounted to base 1 by studs extending from each of the aforementioned parts through holes in said base 1 fastened by nuts and mechanically held to base 1 by said nut-stud combination. Loudspeaker 190 is mechanically held by its mounting bracket with screws 250 holding the loudspeaker bracket to base 1.

A start relay momentary control switch 92 is comprised of moving contact element 94 and stationary contact element 95 insulated from base 1 by an insulating strip affixed to base 1 by mounting screws or like means. Mounting screws also hold contacts 95 and 94 respectively to the insulating strip. Stationary contact connecting terminal 98 provides electrical connection means to contact 95 and movable contact connecting terminal 101 provides electrical connection means to contact 94. Start relay momentary contact control switch insulating rod 93 situated at the tip of moving contact 94 cooperates momentarily with cam 88 towards the end of each record injection cycle.

An injector motor contact control switch 105 comprised of moving contact element 108 and stationary contact element 106 are insulated from base 1 by an insulating strip affixed to base 1 by mounting screws or like means. Mounting screws and electrical connecting terminal combination 111 and 113 respectively hold moving contact element 108 and stationary contact element 106 firmly affixed to aforementioned insulating strip which in turn is held attached to base 1. Insulating rod 107 mechanically attached to the tip of moving contact element 108 cooperates with the extended or high portion of injector motor programming cam 104 at the beginning of the record injection cycle. Cam 88 is mechanically held to the shaft 117 of injector motor 118. Programming cam 104 is also held attached mechanically to shaft of injector motor 117.

Cam 88 also includes a guide bar extension bearing rod 87 extended from and mechanically screwed into the side of cam 88. The guide bar extension bearing rod 87 is inserted between a left vertical member 84 and a left vertical member return 85 of record injector bar assembly 80 so as to cooperate with members 84 and 85 during the record injection cycle.

*Record injection cycle.*—This cycle is started when start cycle push button 194 is manually depressed momentarily, starting motor 118 which rotates cams 104 and 88 in a clockwise direction simultaneously because both cams are mounted on injector motor shaft 117. Bearing rod 87 then moves upward to the top of member 84 when cams 88 and 104 have moved 90 degrees in a clockwise direction causing record injection assembly 80 to move halfway into the record carrier magazine 19. Bearing rod 87 continues to be moved downwardly and in engagement with member 84 until the rod has turned to a position halfway from the top of member 84. The record injection assembly has then fully returned record 75 to its appropriate storage compartment in the carrier magazine 19. The indexing mechanism 17 advancing carrier magazine 19, and record injection assembly 80 are then positioned to enable selection of a new record 75 at which time essentially 180 degrees of clockwise rotation of cams 88 and 104 have been completed. A new record 75 is injected by means of bearing rod 87 cooperating with member 84 during clockwise rotation of cams 88 and 104 for the next 90 degrees to complete 270 degrees of cam rotation, when the bearing rod 87 is positioned at the lower extremities of segments or members 84 and 85. In the final 90 degrees of rotation of cams 88 and 104 to complete the 360 degree rotational cycle, bearing rod 87 is moved to cooperate with member 85 so that bearing rod 87 moves to its final position at the center of member 84, which corresponds to its end of record injection cycle or its start position. Stopping of cam 88 and cam 104 rotation is achieved by virtue of the cam 104 having moved contact 108 away from contact 106 so that contacts 108 and 106 no longer cooperate with each other thus electrically disconnecting power from motor 118 and stopping rotation of said cams 88 and 104.

Figure 8:
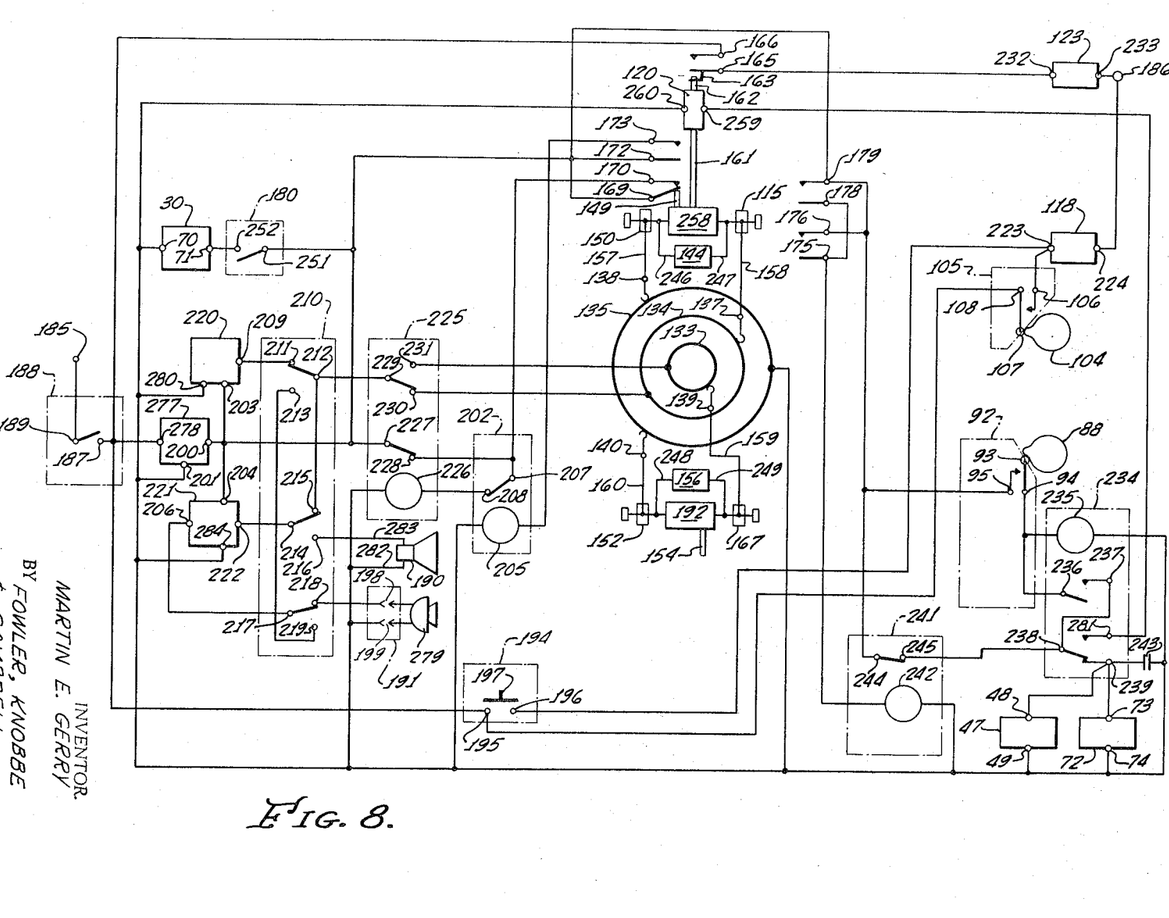
FIG. 8 is a circuit schematic of the control circuitry of a sound and slide projector construction in connection with the sound projector.

*Electrical circuit schematic.*—The automated scanner transporter recorder control circuit is schematically shown in FIG. 8, and is comprised of alternating current power source means 185, and alternating current power return means 186. Alternating current power source means 185 is electrically connected to main alternating current power switch blade 189 of main alternating current power switch 188. Alternating current power input means terminal 187 of switch 188 is electrically connected to input terminal 278 of alternating current to direct current rectifier 277 to stationary contact of record motor activator switch 166 to start cycle push button stationary contactor 195 of start cycle push button 194 and to movable contact 108 of injector motor control switch 105. Direct current positive output power means terminal 200 of rectifier 277 is electrically connected to direct current power input terminal 203 of modulator 220 to direct current power input terminal 204 of amplifier 221, to movable contact 227 of relay 225, to movable contact 172 of head 156 transfer switch 182, to movable contact 251 of record carrier magazine forward-reverse switch 180, to movable contact 169 of head 144 transfer switch 181, to stationary contact 179 of head 156 end of travel switch 184, to stationary contact 176 of head 144 end of travel switch 183, to movable contact 244 of end of cycle stop relay 241 and to stationary contact 95 to switch 92.

Direct current negative and signal ground return circuit are common to each other and electrically connected with each other by virtue of negative direct current power means return terminal 201 of rectifier 277 being electrically connected to modulator power return terminal 280 of modulator 220; to signal return terminal 284 of amplifier 221; to microphone jack signal return terminal 199 of microphone jack 191; to signal return terminal 282 of speaker 190; to the return side of coil 226 of relay 225; to reverse record carrier solenoid power return terminal 70 of reverse record carrier solenoid 30; to cycle termination return terminal lug 260 of cycle termination solenoid 120, to the return side of head 156 selector relay coil 205 of relay 202; and, to the common signal return commutator ring 135 and thence to head 144 via brush contact 138, signal return lead 157, bobbin mount 150 and wire connection 246. Similarly, the signal return circuit is connected to head 156 via brush contact 140, lead wire 160, bobbin 152, and lead wire connection 248. The signal return circuit is further connected to the return side of coil 242 of end of cycle stop relay 241, to return side of time delay capacitor 243, to return terminal 49 of backplate retract solenoid coil 47, to return terminal 74 of retention bar retract solenoid coil 72, and to return terminal of record cycle start relay coil 235 of record cycle start relay 234.

Stationary contact 252 of record carrier magazine forward-reverse switch 180 is electrically connected to power input terminal 71 of reverse record carrier solenoid 30. Output terminal 209 of modulator 220 is electrically connected to stationary contact 211 of record-reproduce switch 210. Movable contact 212 of record-reproduce switch 210 is electrically connected to stationary contact 215 of record-reproduce switch 210 and to movable contact 229 of relay 225. Signal input terminal 206 of amplifier 221 is electrically connected to movable contact 217 of record-reproduce switch 210. Output terminal 222 of amplifier 221 is electrically connected to movable contact 214 of record-reproduce switch 210. Stationary contact 213 and stationary contact 219 of record-reproduce switch 210 are electrically connected together. Stationary contact 218 of record-reproduce switch 210 is electrically connected to signal input terminal 198 of microphone jack 191. Microphone 279, through its microphone plug, is electrically connected to and cooperates with terminals 198 and 199 of microphone jack 191. Stationary contact 216 of record-reproduce switch 210 is electrically connected to signal input terminal 283 of loudspeaker 190. Stationary contact 208 of relay 202 is electrically connected to one side of a coil 226 forming part of relay 225. Stationary contact 228 of relay 225 is electrically connected to movable contact 207 of relay 202 and to stationary contact 170 of head 144 transfer switch 181. Stationary contact 173 of head 156 transfer switch 182 is electrically connected to coil 205 of head 156 selector relay 202.

Stationary contact 230 selector relay 225 for head 144 is electrically connected to the other lead of head 144 via signal commutator ring 134, brush contact 137, wire 158, to bobbin 115, and wire 247. Stationary contact 231 of selector relay 225 is electrically connected to the other terminal of head 156 via signal commutator ring 133, brush contact 139, wire 159, bobbin 167 and wire 249.

Stationary contact 196 of start cycle push button 194 is electrically connected to terminal 223 which is the alternating current input power terminal of injector motor 118. Push button 194 is capable of enabling alternating current power to be applied to injector motor terminal 118 when contactor 197 of push button 194 is manually depressed so that the contactor cooperates with stationary contacts 195 and 196 of push button 194. Terminal 223 of injector motor 118 is electrically connected to stationary contact 106 of injector motor control switch 105. Movable contact 165 of record motor activator switch is electrically connected to alternating current power input terminal 232 of record drive motor 123. Terminal 233 of record drive motor 123 is electrically connected to alternating current power return means 186. Terminal 259 of cycle termination solenoid 120 is electrically connected to stationary contact 281 of record cycle start relay 234.

Stationary holding contact 237 of record cycle start relay 234 is electrically connected to movable contact 238 of record cycle start relay 234, to stationary contact 245 of end of cycle stop relay 241, and stationary contact 95 of start record cycle switch 92 is connected to direct current positive power means. Moving contact 94 of start record cycle momentary switch 92 is electrically connected to record cycle start relay coil 235 and to movable holding contact 236 of record cycle start relay 234. Stationary contact 239 of relay 234 is electrically connected to terminal 73 of retention bar retract solenoid coil 72 to terminal 48 of backplate retract solenoid coil 47, time delay capacitor 243. Movable contact 178 of head 156 end of travel switch 184 and movable contact 175 of head 144 end of travel switch 183 are electrically connected to each other and to coil 242 of end of cycle stop relay 241.

*Circuit operation.*—When main alternating current switch 188 is closed so that contact 189 cooperates with contact 187, and when switch 210 is in the record position as shown in the schematic diagram, contact 212 cooperates with contact 211, contact 214 cooperates with contact 215, and contact 217 cooperates with con-contact 218 electrically connecting microphone 279 to the input of amplifier 221, applying modulation voltage or bias from modulator 220 to amplifier 221 and recording head 144 or 156 depending on which recording head has been programmed into use.

Head 144 is in use when relay 225 is held energized due to the fact that relay 202 is deenergized and head 144 transfer contact stop shaft 149 is depressing contact 169. Contacts 169 and 170 of switch 181 are in engagement and thereby apply direct current power to coil 226 of relay 225 via normally closed and cooperating contacts 207 and 208 of relay 202. Contacts 227 and 228, which are the normally holding contacts of relay 225, cooperate wtih each other and hold and relay 225 energized so that contacts 229 and 230 of relay 225 cooperate with each other to provide the electrical connection between switch element 212 and the coil of head 144.

Head 156 is in use when relay 225 is deenergized due to the fact that relay 202 is energized and head 156 transfer contact stop shaft 154 depresses contact 172. Contact 172 then cooperates with contact 173 to provide direct current power to coil 205 of relay 202 thusly energizing relay 202 and causing cooperating contacts 207 and 208 to cease cooperating and removing any direct current power that may have been present on coil 226 of relay 225. Such power would have been due to the other shaft 149 previously having caused direct current power to be applied to coil 226 through cooperating contacts 169 and 170 to cooperating holding contacts 227 and 228. With cooperating contacts 207 and 208 ceasing to cooperate, power is removed from relay coil 226 thereby transferring electrical connection from contact 229, which cooperated with contact 230, to contact 231 which now cooperates with contact 229 thus providing electrical connection between switch element 212 and coil of head 156.

In the reproduce position, switch 210 elements are reverse to the record position so that contact 212 cooperates with contact 213 thereby disconnecting the modular output from either of the aforementioned recording heads. Contact 217 cooperates with contact 219 for disconnecting the microphone 279 from amplifier 221 input and connecting either of the aforementioned recording heads to the amplifier 221 input. Contact 214 cooperates with contact 216 thereby disconnecting the modulator 220 output from amplifier 221 output and connecting the amplifier 221 output to the loudspeaker 190.

The circuit controlling the injection of the record-slide combination controls the positioning and registration of the record-slide combination, and the recording or reproducing of the sound on the record is as follows: When start cycle push button 194 is manually momentarily depressed, closure bar 197 causes contacts 195 and 196 to cooperate with said closure bar 197, momentarily applying alternating current power to the motor 118, which has mechanically mounted on its drive shaft cams 104 and 88. These cams start rotating in a clockwise direction, which starts ejection of record 75 previously injected into the projector. Cam 104 having rotated several degrees so that the high point of the cam 104 no longer makes contact nor cooperates with insulating rod 107 of movable contact element 108, causing contact 108 to cooperate with stationary contact element 106 and permitting alternating current power to be applied from switch contact 195 through cooperating contacts 108 and 106 to motor 118. Accordingly, when manual pressure from switch 194 is released and contactor 197 ceases to cooperate with contacts 195 and 196, alternating current power is still applied to motor 118 until cam 104 essentially completes 360 degrees of revolution, at which time the high point of said cam 104 cooperates with rod 107, causing the contacts 108 and 106 to cease to cooperate. Alternating current power is then removed from motor 118, causing said motor 118 to stop. In the meantime as hereinbefore described, ejection of record 75 occurs into record carrier magazine 19, record index mechanism 17 advanced to the next record or reversed to the previous record depending if record carrier magazine forward-reverse switch 180 is in the forward operating direction due to solenoid 30 being deenergized, or in the reverse operating direction when solenoid 30 is energized with direct current power due to contacts 251 and 252 of switch 180 cooperating with each other, and a new record 75 is injected as hereinabove described.

Cam 88 rotates simultaneously with the rotation of cam 104. During substantially most of the cycle of 360 degree rotation of said cam 88, coil 235 of relay 234 is deenergized, and coil 242 of relay 241 is deenergized so that direct current power applied through cooperating contacts 244 and 245 of relay 241 and through cooperating contacts 238 and 239 of relay 234 to backplate retract solenoid coil 47 and retention bar retract solenoid coil 72 retains backplate 40 in a retracted position and record retention bar 50 in a retracted position to allow freedom of ejection and injection of record 75. However, near substantially the completion of cam 88 rotation, the high point on cam 88 is reached (record 75 being injected). This high point cooperates with insulating rod 93 mechanically attached to and part of moving contact element 94 so that contact 94 momentarily cooperates with contact 95 and momentarily applies direct current power to coil 235. This coil 235 is then energized, thereby energizing relay 234 and causing holding contacts 236 and 237 to cooperate with each other holding said relay 234 energized due to the fact that direct current power is applied through cooperating contacts 244 and 245 of relay 241 (relay 241 being deenergized). Simultaneously, direct current power is removed from solenoid coils 47 and 72 due to the fact that contacts 238 and 239 of relay 234 cease to cooperate thereby permitting the proper positioning and the exact vertical and horizontal registration of the record 75 for either recording or reproducing of sound.

When relay 234 is energized, contact 238 cooperates with contact 281 thereby applying direct current power to terminal 259 of cycle termination solenoid 120 and energizing same. At a previous time, this solenoid positioned head 144 or head 156 ready to record or reproduce sound. In either case of head 144 or head 156, shaft 161 of cycle termination solenoid 120, having been inserted in slot 143 in the case of head 144, or in a similar slot in the case of head 156, is now retracted or pulled up out of said slot 143 for head 144 or equivalent slot for head 156, by electro-mechanical action of solenoid 120. Operation of solenoid 120 causes an armature 162 welded or otherwise mechanically affixed to solenoid shaft 161 and affixed protrusion 163 (FIGS. 2A and 8), to engage contact 165 which cooperates with contact 166 thus making an electrical connection and causing alternating current power to be applied to record drive motor 123. The sound reproduction assembly is thus caused to both rotate about a first axis and translate along an orthogonal axis resulting in movement of each of the recording heads in a spiral geometric pattern. At the end of the spiral recording or reproducing pattern path traced, end of travel contact pair 175 and 176, or end of travel contact pair 178 and 179, are caused to momentarily cooperate by either head 144 transfer contact stop shaft 149 or by head 156 transfer contact stop shaft 154 engaging and depressing action upon moving contact 175 or moving contact 178 depending on which recording head is then programmed for record or reproduce action. Due to cooperation of either of said contact pairs 175 and 176 or 178 and 179, direct current power is momentarily applied to coil 242 energizing relay 241 and causing contacts 244 and 245 to cease to cooperate, removing direct current power from holding contacts 237 and 236 of relay 234 thereby deenergizing coil 235 and disengaging contact pair 238 and 281. Direct current power is thus removed from terminal 259 of cycle termination solenoid 120 which is deenergized, releasing shaft 161 together with its affixed armature 162 and protrusion 163. The downward drop of shaft 161 due to gravity relieves the cooperating action of contact pair 165 and 166 so that they cease to cooperate, thus removing alternating current power from motor 123 and causing slot 143 in head mounting assembly 142 to coast into and cooperate with shaft 161 to bring the record-reproduce head drive and assembly mechanism to an exact stop position, thereby effecting accurate registration of record-reproduce head and record 75 combination.

Capacitor 243 across the coils 47 and 72 of solenoids 41 and 66 has a finite charge time, which prevents the immediate retraction of solenoids 41 and 66 by providing a time delay in the energizing of solenoid coils 47 and 72. Accordingly, motor 123 is permitted to come to a complete stop before backplate retract solenoid coil 47 and retention bar retract solenoid coil 72 are again energized. Thus, the charge on capacitor 243 causes time delays in the reenergizing of the solenoid coils 47 and 72, retracting solenoids 41 and 66 respectively, thereby mechanically removing tension from record 75 and permitting a complete recycling operation to take place by again manually depressing push button 194.

I claim:
1. In an apparatus for optically projecting visual information and reproducing sound from a stationary slide containing said visual information and a spiral sound track, the combination of
   a sound reproduction assembly, supported for rotation about a first axis perpendicular to said slide and for linear motion along a second axis, parallel to said slide, which is rotatable about and intersects said first axis, comprising
      a pair of sound reproducing heads and means for mounting said heads a predetermined distance apart comprising a shaft having said heads respectively mounted at opposite ends thereof, said shaft having oppositely pitched helical threads thereon; and,
      means for rotating said assembly about said first axis and means for translating said assembly along said second axis as said assembly is rotated,
      said means for rotating comprising a generally cylindrically shaped member rotatably driven about an axis perpendicular to its longitudinal cylindrical axis, said member including means for supporting said shaft for linear translation along said cylindrical axis and preventing rotation about said cylindrical axis,
      said means for translating comprising a follower member in engagement with the helical threads of said shaft,
      means carried by said cylindrically shaped member for supporting said follower member for rotation in a plane perpendicular to the said cylindrical axis, and
      means, and thereby said follower member, for rotating said follower member support means about said longitudinal cylindrical axis accord- ing to the rotation of said cylindrical member so that sound reproducing heads trace respective spiral paths in the plane of said slide.

2. The apparatus described in claim 1 wherein said means for preventing rotation of said shaft about the cylindrical axis of said cylindrically shaped member comprises,
   a bearing affixed within said generally cylindrically shaped member and having a non-circular bearing aperture, said shaft being formed with a like non-circular cross-sectional configuration and located in said bearing so that said shaft may be translated in said bearing along its longitudinal axis but is prevented from rotating about its longitudinal axis.

3. The apparatus described in claim 2 wherein said shaft has a generally square cross-sectional configuration, said shaft being mounted within a corresponding bearing aperture formed in the bearing affixed within said cylindrically shaped member.

4. The apparatus described in claim 1 wherein said means for supporting said follower member comprises a member rotatably mounted with respect to said generally cylindrically shaped member and mounting said follower member on the inner wall thereof for engagement with the helical threads of said shaft.

5. The apparatus described in claim 1 wherein said means for rotating said follower member support according to the rotation of said cylindrical member comprises
   a stationary bevel gear whose axis is concentric with the axis of rotation of said sound reproduction assembly and
   another bevel gear affixed to and rotatable with the follower member support and in engagement with said stationary bevel gear so that said another bevel gear rotates in accordance with rotation of said sound reproduction assembly.

6. The apparatus of claim 1 in combination with a base,
   a slide carrier magazine carrying a plurality of slides and supported for translatory movement on said base along an axis orthogonal to the plane of said slides,
   means for injecting a single slide into said projector from said carrier magazine, said means being supported for translatory movement on said base along an axis parallel to said slides, and
   means for automatically translating said magazine in conjunction with the removal of a slide from said projector by said record injector assembly, said means advancing said magazine to the next slide position after a slide has been withdrawn from the projector and returned to a predetermined location within the magazine.

7. In the projector apparatus described in claim 6 wherein said means for automatically translating said magazine comprises
   a rack gear affixed to said slide carrier magazine,
   an index gear rotatably mounted on said base in engagement with said rack gear,
   an index plate supported by said base for translatory movement along an axis parallel to said slides,
   a pawl having one end adapted for engagement with said index gear and the other end mounted to said index plate,
   means carried by said slide injector means for engaging said index plate after a slide has been withdrawn from the projector and replaced within said carrier magazine so that (1) said index plate is translated, (2) said pawl on said index plate is moved relative to said index gear causing rotation of said index gear through a predetermined angular displacement, and (3) said carrier magazine is translated to the position of the next slide as the result of engagement of said index gear with said rack gear.

8. The projector magazine described in claim 7 comprising
   a second pawl carried by said index plate and oppositely disposed the other pawl, and
   means for selectively engaging either said first or said second pawl with said index gear so that said slide carrier magazine is translated in either a forward or reverse direction depending upon whether said first or said second pawl is in engagement with said index carrier.

9. In an apparatus for optically projecting visual information and reproducing sound from a stationary slide containing said visual information and a spiral sound track, the combination of
   a sound reproduction assembly comprising a pair of heads, means for supporting said heads a predetermined distance apart,
   means for supporting said sound reproduction assembly for rotary motion about a first axis fixed in space and perpendicular to said slide and means for supporting said sound reproduction assembly for linear motion along a second axis parallel to said slide and rotatable about and intersecting the said first axis,
   means for rotating said assembly about said first axis and means for translating said assembly along said second axis as said assembly is rotated and means for reversing the direction of translation of said assembly so that one of said heads traces a spiral path from a predetermined start to a predetermined end position corresponding to the start and end of said sound track and the other of said heads traces a spiral path from said end to said start position so that one of said heads is always automatically returned to said start position at the termination of a record scan, and
   means for arresting the rotation of said sound reproduction assembly when one of said heads has been translated from said start to said end position.

10. In the apparatus described in said claim 9 wherein said means for arresting rotation of said sound reproduction assembly comprises
    a stop member,
    means for actuating said stop member a predetermined interval prior to one of said heads arriving at said end position, and
    means carried by each of said sound reproducing heads for physically engaging said stop member.

11. The apparatus described in claim 10 wherein said means for arresting rotation of said sound reproduction assembly includes
    a first stationary switch actuated only by one of said sound reproducing heads a predetermined interval prior to said head arriving at said end position, and
    a second stationary switch actuated only by the other of said heads a predetermined interval prior to said head arriving at said end position, and
    means operatively connecting said switches to said stop member.

12. In the apparatus described in claim 10 wherein said means for rotating said assembly includes an electric motor rotatably driving said assembly and said means for arresting rotation of said head assembly includes a first transfer shaft on said means for supporting said heads adjacent one head and a second transfer shaft on said means for supporting said heads adjacent the other head,
    a first stationary switch momentarily actuated only by said first transfer shaft a predetermined interval prior to said one head arriving at said end position,
    a second stationary switch momentarily actuated only by said second transfer shaft a predetermined interval prior to said other head arriving at said end position, and means connecting said switches in circuit with said stop member and the electrical motor, said electric motor being deenergized upon actuation of one of said switches so that said heads are coasting to a stop when they physically engage said stop member.

13. The apparatus described in claim 10 wherein said stop member comprises a shaft translatable along its axis for engagement either with a slot formed in one of said sound reproducing heads or a like slot formed in the other sound reproducing head.

14. In an apparatus for optically projecting visual information and reproducing sound from a stationary slide containing said visual information and a spiral sound track, the combination of
- a sound reproduction assembly comprising a pair of heads mounted a predetermined distance apart,
- means for supporting said sound reproduction assembly for rotary motion about a first axis fixed in space perpendicular to said slide and for linear motion along a second axis parallel to said slide and rotatable about and intersecting the said first axis, and
- means for rotating said assembly about said first axis and means for translating said assembly along said second axis as said assembly is rotated and means for reversing the direction of translation of said assembly so that one of said heads traces a spiral path from a predetermined start to a predetermined end position and the other of said heads traces a spiral path from said end to said start position.

15. The apparatus described in claim 14 wherein said means for translating said sound reproduction assembly includes
means for translating said sound reproduction assembly in respectively opposite directions along said second axis for successive sound reproduction cycles.

16. The apparatus described in claim 14 comprising means for electrically energizing said heads in alternation so that whichever head comes to rest at said predetermined start position is the head which is electrically energized during the subsequent sound reproduction scanning cycle.

17. In an apparatus for optically projecting visual information and reproducing sound from a stationary slide containing said visual information and a sound track, the combination of
- a pair of sound reproducing heads fixedly supported at both ends of a shaft and 180 degrees displaced from each other, said shaft being in a plane parallel to said slide and the recording surfaces of said heads being tangential to said slide, and
- a first means for rotating said shaft about a first axis perpendicular to said slide, and a second means for translating said shaft, as said shaft is rotated, along a second axis rotatable about and perpendicular to said first axis and parallel to said slide alternately in one direction and then in a direction 180 degrees opposite to the said one direction so that said heads are used in alternation without the necessity of retracing said heads between successive sound reproduction scan cycles.

References Cited

UNITED STATES PATENTS 2,929,633   3/1960   Hoshino et al. _______ 274—4.2

LEONARD FORMAN, *Primary Examiner.*

JOEL M. FREED, *Assistant Examiner.*